J. B. NORRIS.
WELL BORING APPARATUS.
APPLICATION FILED FEB. 24, 1912.

1,044,073.

Patented Nov. 12, 1912.

WITNESSES:
Earl M. Frankland
W. D. Stancliff.

INVENTOR
Joseph B. Norris.

BY John M. Shellu
ATTORNEY

UNITED STATES PATENT OFFICE.

JOSEPH B. NORRIS, OF CORSICANA, TEXAS, ASSIGNOR OF ONE-HALF TO FREDERICK M. ALLISON, OF CORSICANA, TEXAS.

WELL-BORING APPARATUS.

1,044,073.

Specification of Letters Patent.

Patented Nov. 12, 1912.

Application filed February 24, 1912. Serial No. 679,614.

*To all whom it may concern:*

Be it known that I, JOSEPH B. NORRIS, a citizen of the United States, residing at Corsicana, in the county of Navarro and State of Texas, have invented certain new and useful Improvements in Well-Boring Apparatus, of which the following is a specification.

This invention relates to new and useful improvements in well boring apparatus, and relates more particularly to that class of apparatus which employs a rotary machine to rotate a drill pipe, said pipe carrying a drill bit on its lower extremity.

The object of the invention is to provide a rotary and a drill, such that the grips on the rotary will positively engage the drill pipe, communicating to it the rotation of a rotary table, through the center of which said pipe passes.

A further object is to provide a rotary and drill pipe which will not require the grips to bear against the pipe with any considerable pressure, thus allowing the drill pipe greater freedom to move vertically.

In the well boring apparatus of this class, now in use, grip rings having sharp edges or teeth are adjustably mounted on a rotatable table, and are adapted to engage the outer surface of a cylindrical drill pipe. The grip rings impart rotation to said pipe by embedding a portion of the sharp edges or teeth in the surface of the pipe, which operation soon cuts the surface of the pipe into grooves and channels, materially weakening the same and causing it to become unfit for further use. The grips also slip on the pipe when harder drilling is encountered, thus doing further damage. The grips furthermore prevent the pipe from feeding down, unless a long line of pipe is used, the same providing sufficient weight to cause the grip rings to cut the aforesaid grooves and channels.

The object is finally to provide an apparatus which will eliminate these objectionable features, and which will be strong, durable, comparatively easy to construct, and one in which the various parts are not likely to get out of working order.

Figure 1:
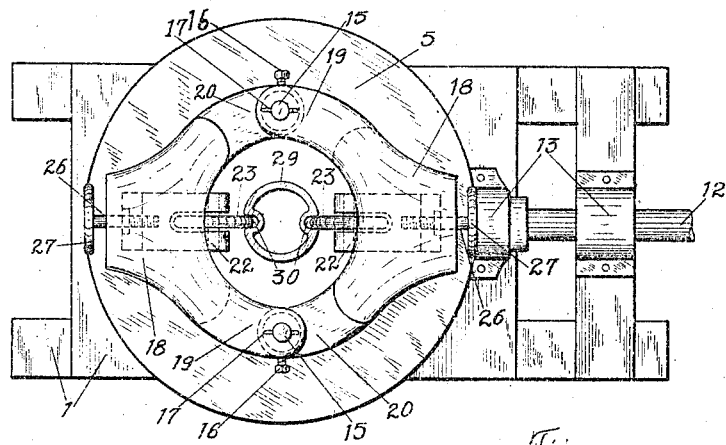
Figure 2:
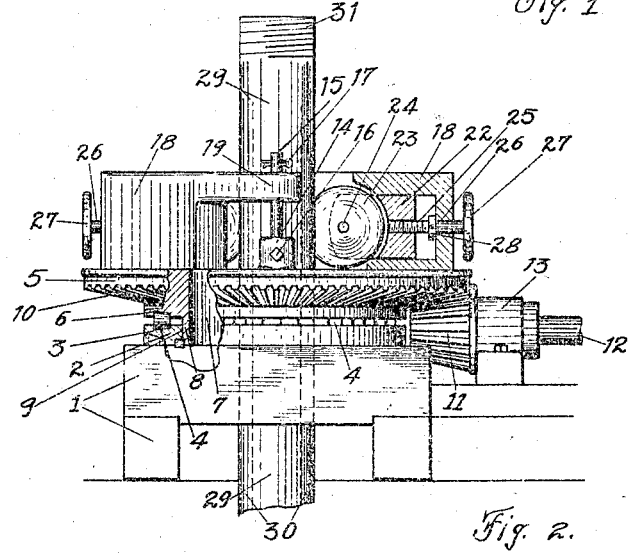
Figure 3:
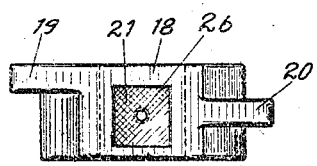

With these and various other objects in view, this invention has relation to certain novel features of the construction and operation, an example of which is described in the following specification and illustrated in the accompanying drawing, wherein;

Figure 1 is a plan view of the well sinking apparatus, the pipe being shown in section. Fig. 2 is an elevation view of the same as in Fig. 1, but with a portion of the table and bed plate shown broken away and sectioned, including also a section through one of the clamp yokes and grip wheel blocks adjacent to the side of said grip wheel. Fig. 3 is a side elevation of one of the clamp yokes, as seen on the inside or concave side.

Referring now more particularly to the drawings, wherein like reference characters designate like parts in all the figures, the numeral 1 denotes a timber frame work supporting the rotary. A bed plate 2 is mounted on the frame, and has an annular cone-race 3 adapted to receive the cones 4.

A circular table 5 is provided with a cone-race 6 on its under side, adapted to bear on the cones 4. The table 5 is also provided with a circular concentric aperture 7 and a flange 8, the inner surface of which is flush with said aperture, its outer surface slidably engaging the edges of a concentric aperture 9 on the bed plate 2. The bevel gear teeth 10 are formed on the under side of the table, and are adapted to mesh with a driving pinion 11 mounted on a driving shaft 12. The driving shaft 12 is adapted to rotate in suitable bearings 13, and carries on its outer end a sprocket wheel or other driving means not shown. The upper surface of the table 5 is flat with the exception of two lugs 14 cast on the same, and bored out to receive the vertical driving pins 15. The pins 15 are held in the sockets thus formed by set-screws 16, and are drilled in their upper ends for the cotter pins 17. On the table 5 are mounted the clamp yokes 18, having the projecting ends 19 and 20 adapted to engage the driving pins 15, said yokes being also adapted to swing around one of said pins as a pivot when the other pin is withdrawn.

A cavity 21 of rectangular cross section is provided in the central portion of each yoke 18, and is constructed to receive a grip wheel base block 22. A grip wheel 23 is rotatably mounted in the block 22, and is adapted to rotate on a pin 24. The block 22 is constructed to move in and out of the cavity 21, said movement being controlled by an adjusting screw 25 threaded in the base of said block. The screw 25 passes through an aperture 26 in the yoke casting, and terminates in a hand-wheel 27. A set collar 28 is provided on the screw 25, and bears against the inner wall of the cavity 21, to take the thrust from the block 22.

A drill pipe 29, having longitudinal grooves or channels 30, adapted to receive the grip wheels 23, is engaged by said grip wheels which hold said pipe in a central position with reference to the central aperture 7. They also cause the pipe to rotate as the table on which they are mounted rotates. The wheels 23 allow the pipe to undergo a vertical displacement while it is being rotated. The longitudinal grooves or channels in the pipe 29 terminate near each end leaving the ends 31 circular to receive pipe threads. Only one joint of the grooved pipe would be necessary in operating the apparatus, it being removed when its upper end reaches the rotary and a joint of plain pipe substituted. The joint of grooved pipe thus used would be strictly a part of the rotary mechanism, being only employed to impart rotation to the remainder of the drill line which would be composed of the ordinary drill pipe.

It is obvious that the form and proportion of the various parts of this invention may be changed without departing from the spirit thereof, and the same is therefore submitted as covering all such modifications as come within the scope of the following claims.

What I claim is:

1. In a well boring apparatus, the combination with a rotatable table having a central aperture adapted to receive a drill pipe, of a pair of bifurcated castings mounted upon said table, one at each side of said aperture, pipe gripping means, one of which is mounted in each of said castings, means for pivotally attaching said castings at their extremities to the table, said means permitting said castings to be turned away from the drill pipe to facilitate the removing of the latter.

2. In a well boring apparatus, the combination with a rotatable table, having a central aperture adapted to receive a drill pipe, of a pair of bifurcated castings one of which is mounted at each side of said aperture, a pipe gripping means mounted in each of said castings, vertical pins mounted on said table adapted to pivotally engage the ends of said castings, each of said pins being removable to permit a pivotal movement of the castings on the other pin.

3. In a well boring apparatus, the combination with a rotatable table of various forked castings, means for pivotally attaching said castings at their forked ends with the table, said castings being provided each with a cavity adapted to receive adjustable base blocks, said base blocks each carrying a rotatably mounted grip wheel having a convex face, and adjusting screws for moving said base blocks.

4. In a well boring apparatus, the combination with a rotatable table of various forked castings, means for pivotally attaching said castings at their forked ends with the table, gripping wheels having convex faces adjustably mounted in said forked castings, and a drill pipe section provided with longitudinal grooves or channels adapted to receive said grip-wheels.

In testimony whereof I have signed my name to this specification in the presence of two subscribing witnesses.

JOSEPH B. NORRIS.

Witnesses:
CHAS. R. STEELY,
W. J. CHENEY.